United States Patent [19]

Wilson et al.

[11] Patent Number: 5,223,181
[45] Date of Patent: Jun. 29, 1993

[54] PROCESS FOR SELECTIVELY CONCENTRATING THE RADIOACTIVITY OF THORIUM CONTAINING MAGNESIUM SLAG

[75] Inventors: David A. Wilson; Steven H. Christiansen, both of Richwood; Jaime Simon; Dana W. Morin, both of Angleton, all of Tex.

[73] Assignee: The Dow Chemical Company, Midland, Mich.

[21] Appl. No.: 676,137

[22] Filed: Mar. 27, 1991

[51] Int. Cl.$^5$ .............................................. G21F 9/08
[52] U.S. Cl. .................................. 252/631; 252/626; 252/633; 423/3; 423/11; 423/17; 210/751
[58] Field of Search ...................... 252/626, 633, 631; 423/165, 155, 158, 252, 3, DIG. 20, 11, 17; 210/751; 75/394

[56] References Cited

U.S. PATENT DOCUMENTS

| | | | |
|---|---|---|---|
| 2,733,126 | 1/1956 | Spiegler | 423/20 |
| 2,932,555 | 4/1960 | Flynn | 423/11 |
| 3,120,435 | 2/1964 | Chiotti | 75/394 |
| 3,158,468 | 11/1964 | Pearlman et al. | 75/394 |
| 3,489,513 | 1/1970 | Ferris | 423/166 |
| 4,689,178 | 8/1987 | Gay et al. | 252/626 |

FOREIGN PATENT DOCUMENTS 9102 9/1841 United Kingdom.

OTHER PUBLICATIONS

D. Bradbury, "Development of Chemical Methods of Radioactive Waste Management for U.K. Power Reactor Sites", ANS/DOE Treatment & Handling of Radioactive Wastes (Batelle/Springer-Verlag) Conf., Richland, Wash., pp. 377-380 (Apr. 19-22, 1982).
Bradbury et al., "Magnox Dissolution in Carbonated Water. A Method of the Separation and Disposal of Magnox from Fuel Element Debris Waste", Water Chem. 3, 345-352 (1983) BNES, London.
The Chemistry of the Actinide Elements, 2d Ed. vol. 1, eds. Joseph J. Katz, Glenn T. Seaborg and Lester R. Morss, in Chapter 3, pp. 41-101, entitled "Thorium".

Primary Examiner—Donald P. Walsh
Assistant Examiner—Ngoclan T. Mai
Attorney, Agent, or Firm—Karen L. Kimble

[57] ABSTRACT

Magnesium is separated from magnesium slag containing radioactive thorium and its daughters by solubilizing magnesium from magnesium slurry using carbon dioxide and separating magnesium from magnesium slurry containing thorium and its daughters by filtering. The process concentrates the radioactive thorium and its radioactive daughters from the magnesium slag and reduces the volume of the radioactive waste that requires disposal.

29 Claims, 1 Drawing Sheet

REACTION SCHEME

PROCESS FOR SELECTIVELY CONCENTRATING THE RADIOACTIVITY OF THORIUM CONTAINING MAGNESIUM SLAG

FIELD OF THE INVENTION

The present invention concerns a process for removing radioactive thorium and its radioactive daughters from magnesium slag and for reducing the volume of the radioactive waste that requires disposal.

BACKGROUND OF THE INVENTION

Radioactive waste sites exist in the United States that contain large volumes of material, several sites are in excess of 100,000 cubic yards. The number of such sites and concern for their management has significantly increased over recent years because of renewed concern over environmental issues, including the disposal of radioactive waste. The best method for the removal of radioactivity from such sites and their long term disposal requirements concerns many governmental agencies and private industry. The number of these sites that can treat and handle the huge amounts of radioactive waste are limited, due in part to the difficulty in identifying and siting new treatment and disposal facilities.

Usual processing of these radioactive sites requires the treatment of large quantities of material, only a portion of which is in fact usually radioactive. Because of tremendous difficulties in economically treating such massive quantities of material to remove the radioactive portion and also meet the radioactivity level requirements for disposal set by government agencies, the best disposal method employed to date has been burial of the radioactive material. The burial method requires hauling large quantities of material, that are regulated as radioactive waste material, frequently many miles to an approved burial site. Therefore, economical methods for the reduction of the volume of the radioactivity for disposal at these sites have been actively sought.

Several methods for a volume reduction of radioactive waste have been explored in the literature. Examples of review articles that describe the issues are:

Energy Digest 15(4), 10–16 (1986), "World Status of Radioactive Waste Management";

Karl Heinz et al., Nuclear Engin. and Design 118, 115–122 (1990), "Volume Reduction, Treatment and Recycling of Radioactive Waste";

"Low-Level Radioactive Waste Reduction and Stabilization Technologies Resource Manual" (December 1988) by Ebasco Services Inc., Bellevue, Wash. for EG&G Idaho, Inc. under subcontract C85-131069 and for the U.S. Department of Energy, Idaho Operations Office under contract DE-AC07-76IDO1570;

A. H. Kibbey and H. W. Godbee, "A State-of-the-Art Report on Low-Level Radioactive Waste Treatment", Oak Ridge National Laboratory, Oak Ridge, Tenn. under the Nuclear Waste Programs ORNL/TM-7427 (1980); and "Technological Approaches to the Cleanup of Radiologically Contaminated Superfund Sites" by the U. S. Environmental Protection Agency, No. EPA/540/2-88/002 (August 1988).

When the radioactive component is a solid, then various physical separation techniques have been investigated based on methods involving: screening; classification; gravity concentration: and/or physical separation using flotation. The screening technique separates components on the basis of size and can be used either on dry material or water can be added, the material is separated by passing it through certain size screens. The classification technique is used to separate particles of material based on their settling rate in a liquid. The gravity concentration technique utilizes density differences to separate materials into layers. The flotation technique is based on physical and chemical phenomena as well as particle size differences. One technique based on gravity and particle size differences is taught in U.S. Pat. No. 4,783,253. In general, however, physical separation techniques will not be useful if the radioactive material is distributed uniformly within each particle size throughout all of the components comprising the mixture.

When the radioactive component is in solution, then filtration, carbon treatment, ion exchange, and/or precipitation techniques are often used. Care must be exercised if a person is considering using any one of these techniques since a high degree of selectivity is required. For example, a precipitation technique may concentrate the majority of the radionuclides in a solid matrix, but if the precipitation was not quantitative then the solution from which the precipitation was preformed may still have sufficient radioactivity to be of concern for disposal. Thus if the process is not selective, the total volume of material for disposal after such processing can increase. These concerns have been raised by Raghaven et al. ["Technologies Applicable for the Remediation of Contaminated Soil at Superfund Radiation Sites", U. S. Environ. Prot. Agency Res. Dev., [Rep.] EPA (1989), EPA/600/9-89/072, Int. Conf. New Front. Hazard. Waste Management, 3rd. ed., 59–66 (1989)] where they indicate that of the 25 contaminated Superfund sites discussed that no chemical extraction or physical separation techniques have actually been used in a remediation situation and that their use must be approached with extreme caution.

Some volume reduction techniques involve the use of incinerators and compactors. If incineration is used, then the off-gases and particulates that are produced must be constantly monitored and treated to ensure that radioactivity is not being released to the environment. Supercompactors, which are compactors that can exert forces in excess of 1,000 tons, have been used to achieve even greater reductions in volume. However, these supercompactors represent a very large capital investment.

Volume reductions based on chemical extraction techniques using mineral acids have been reported. For example, U.S. Pat. No. 4,689,178 discloses the use of sulfuric acid in the recovery of magnesium sulfate from a slag containing magnesium and uranium metal and the oxides, fluorides and mixed oxides and fluorides of the metals. The desired outcome is that the radioactivity will occupy less volume than it did in the original slag. A similar process is described in U.S. Pat. No. 2,733,126.

A process for the treatment of Magnox fuel element debris is described by D. Bradbury in "Development of Chemical Methods of Radioactive Waste Management for U. K. Power Reactor Sites", ANS/DOE Treatment & Handling of Radioactive Wastes (Batelle/Springer-Verlag) Conf., Richland, Wash., pp. 377–380 (April 19–22, 1982). Magnox alloy consists essentially of magnesium metal where about 1% of other alloying elements have been added. After irradiation, the levels of long-lived radioisotopes is reported to be low. Minor constituents in the waste debris, for example the approximately 5 G springs that are used with the spent Magnox fuel elements are produced from a nickel alloy that contains small amounts of cobalt. During irradiation the cobalt becomes activated to give cobalt-60 and the resulting radioactivity of the springs is far greater than from the irradiated Magnox. The process to isolate the radioactive debris from the Magnox alloy involves corroding away the magnesium in an aqueous medium. The process is conducted in a batch wise manner with large quantities of rapid flowing fresh water with carbon dioxide sparging. Care must be taken to maintain the magnesium concentration below the solubility limit, hence the large quantities of water. Since the dissolution also produces hydrogen gas with an exothermic reaction, proper handling techniques are required. A typical Magnox batch dissolution would take 20 days. The degree of dissolution of some of the radionuclides associated with the Magnox process is given by Bradbury et al. in "Magnox Dissolution in Carbonated Water. A Method of the Separation and Disposal of Magnox from Fuel Element Debris Waste", *Water Chem.* 3, 345–352 (1983) BNES, London. For cobalt-60, 29% was dissolved in the effluent.

The above issues have resulted in large increases in cost associated with the disposal of waste [see, for example, "Low-Level Radioactive Waste Regulation", ed. Michael E. Burns, pub. Lewis Publishers, inc. (1988)]. The need therefore to minimize the amount of radioactive waste that has to be placed in an approved landfill or treated in other ways has become of critical importance.

To date no technique exists which is cost effective, safe to the environment and technicians, and attains the selectivity needed for the radioisotopes.

SUMMARY OF THE INVENTION

The present process provides a highly selective, non-toxic and economical process for selectively concentrating the radioactive thorium and its daughters found in magnesium slag using recyclable reagents to concentrate radioactive thorium and its daughters from the magnesium slag, to provide magnesium reclamation, and to reduce the amount of radioactive waste for disposal.

Specifically, it has now been found that in a process for separating magnesium from a magnesium slag using water and carbon dioxide, the improvement comprises:
 a) extracting magnesium from a magnesium slag, which slag contains radioactive thorium and its daughters:
 b) forming an aqueous magnesium slurry from the magnesium slag and water;
 c) reacting the magnesium slurry with carbon dioxide;
 d) selectively concentrating the radioactive thorium and its daughters such that the radioactivity is separated from the magnesium; and
 e) reducing the volume and/or weight of radioactive solids for disposal as radioactive waste.

DETAILED DESCRIPTION OF THE INVENTION

Figure 1:
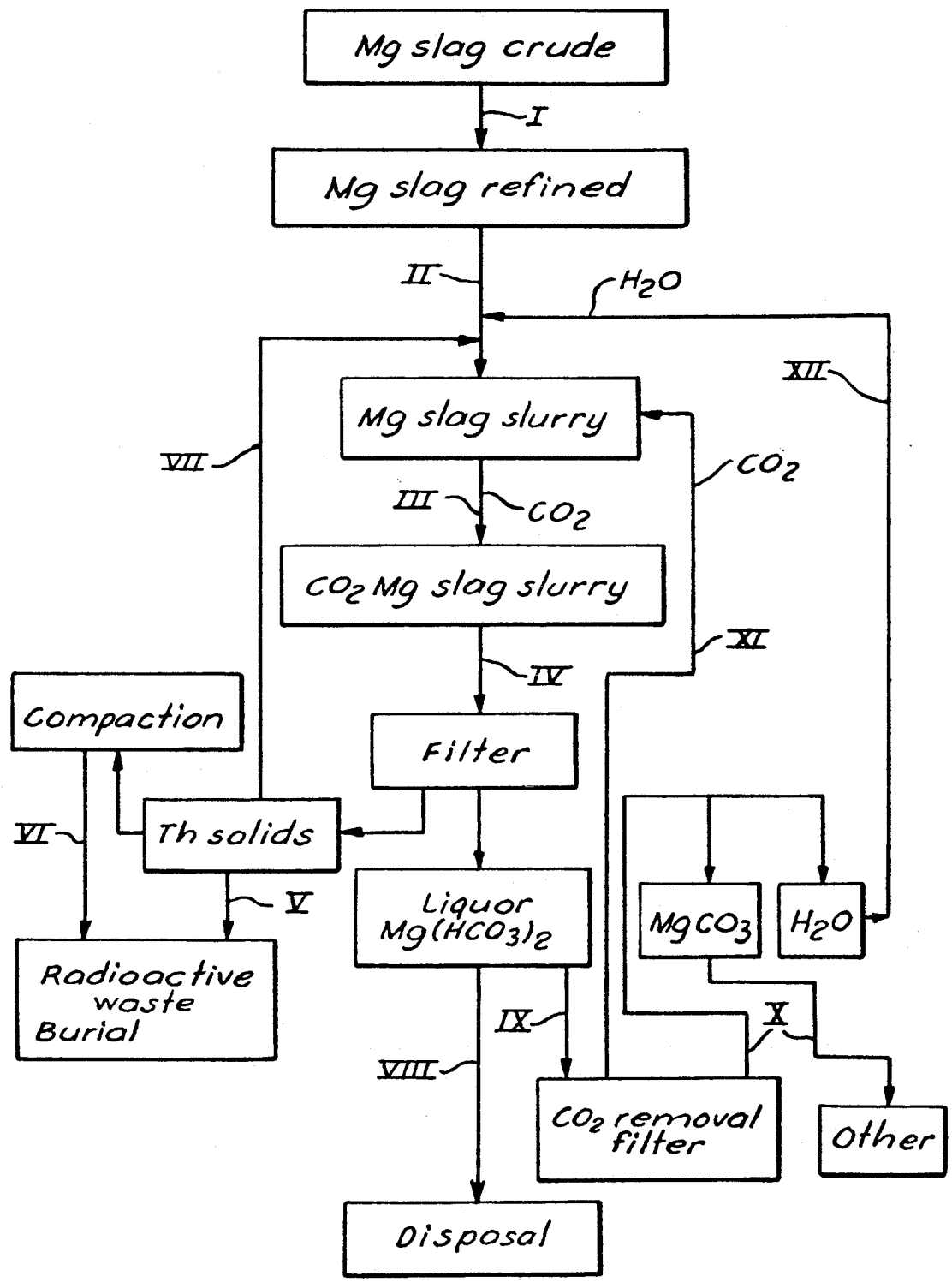
FIG. 1 refers to the schematic flow process for this invention as its Reaction Scheme.

The present invention provides a process for reducing the volume of thorium bearing radioactive waste for disposal from radioactive contaminated sites, thereby significantly reducing the cost for radioactive burial. The present process also allows for the recovery of valuable magnesium compounds for resale. The process is also economical to run on large volumes of material, using reagents that can easily be brought to the site for processing and can be recycled, and does not result in further disposal problems for the reagents or by-products from the process.

Specifically, the present process extracts magnesium from magnesium slag. However, for the present invention the magnesium slag contains radioactive thorium ($^{232}$Th and $^{230}$Th) and radioactive Th daughters. The term "radioactive Th daughters" means $^{232}$Th or $^{230}$Th daughters. These radioactive Th daughters include, as $^{232}$Th daughters, actinium-228 ($^{228}$Ac), bismuth-212 ($^{212}$Bi), lead-212 ($^{212}$Pb), polonium-212 ($^{212}$Po), polonium-216 ($^{216}$Po), radium-224 ($^{224}$Ra), radium-228 ($^{228}$Ra), radon-220 ($^{220}$Rn), thallium-208 ($^{208}$Tl), and thorium-228 ($^{228}$Th) and, as $^{230}$Th daughters, astatine-218 ($^{218}$At), bismuth-210 ($^{210}$Bi), bismuth-214 ($^{214}$Bi), lead-210 ($^{210}$Pb), lead-214 ($^{214}$Pb), mercury-206 ($^{206}$Hg), polonium-210 ($^{210}$Po), polonium-214 ($^{214}$Po), polonium-218 ($^{218}$Po), radium-226 ($^{226}$Ra), radon-222 ($^{222}$Rn), thallium-206 ($^{206}$Tl), and thallium-210 ($^{210}$Tl). When the term "average $^{232}$Th daughters" is used, it is defined as $$\frac{1}{5} \times \left[ [^{228}Ac] + [^{212}Bi] + [^{212}Pb] + [^{224}Ra] + \frac{[^{208}Tl]}{0.35} \right]$$

where [$^{228}$Ac] means the concentration of $^{228}$Ac measured using a germanium [Ge] gamma detector, and similarly for all the other indicated isotopes. Also [$^{208}$Tl] is divided by 0.35 to account for its branching ratio. Only the above indicated five isotopes given in the formula are measured for the radioactive Th daughters. The other isotopes will behave similarly and decay over time to one of the measurable isotopes.

Typically, the non-radioactive components of the magnesium slag include as the major component, hydromagnesite [4 MgCO$_3$.Mg(OH)$_2$.4 H$_2$O], and as minor components BaMg(CO$_3$)$_2$ and Mg$_6$Al$_2$CO$_3$.(OH)$_{16}$.4H$_2$O and others. Thus the starting material used in the present process termed "magnesium slag" includes both the radioactive and non-radioactive components. The magnesium slag is typically a heterogeneous mixture of the components.

The process operates under pressure and uses carbon dioxide and water as the reagents. The basic processing technology is well known and was first used in the mid 1800's for separating magnesium from calcined dolomite. This process is often referred to as the Pattinson process (British Patent 9102, issued Sep. 24, 1841). Several modifications of the Pattinson process have been reported throughout the years.

The selectivity in the present process needed to achieve a radioactive material volume and weight reduction is exceedingly high, as minute quantities of thorium and its daughters can cause the extracted magnesium material (for example, MgO, MgCl$_2$, Mg metal, particularly $MgCO_3$) to be radioactive and thus prevent its sale and pose a further disposal problem. There are ten radioactive $^{232}Th$ daughters. Five of these daughters can be analyzed by gamma spectroscopy. The value obtained from the gamma spectroscopy measurement gives an estimate of the $^{232}Th$ activity since the daughters for the slag that was utilized were found to be in equilibrium with the parent $^{232}Th$. Surprisingly, the Pattinson process as modified by the present invention does not result in the dissolution of radioactive thorium. The process of the present invention is highly efficient in that it uses reduced quantities of water, produces an effluent that is below regulatory concern, permits the recovery of magnesium for sale, selectively concentrates the radioactive thorium and its daughters such that the radioactivity is separated from the magnesium, and reduces the volume and weight of radioactive solids for disposal as radioactive waste. The process may be run as either a batch or continuous process. The reagents employed, water and carbon dioxide, are easily brought to a site and can be recycled in the process.

To more clearly indicate the process of the present invention, the following reaction scheme is provided.

In the Reaction Scheme, FIG. 1, Step I involves the digging of the crude magnesium slag (Mg Slag, crude) from the site location and separating the debris (for example, parts of trees or brush, large waste items such as tires), and grinding the crude magnesium slag to provide the refined magnesium slag.

Step II of the reaction adds water to the refined magnesium slag to give a magnesium slag slurry. The ratio of the refined magnesium slag to water is such that it permits adequate mixing of the slurry (e.g. stirring). The ratio of water to magnesium slag is preferably at least about 1:1, more preferably from about 1:1 to about 10:1, most preferably about 1:1 to about 5:1, and especially preferred at about 3:1.

The magnesium slag slurry is then reacted with carbon dioxide ($CO_2$). $CO_2$ can be introduced by sparging at atmospheric pressure (approximately 14.7 psi). However, higher yields of magnesium, as $Mg(HCO_3)_2$, can be extracted if the reaction is carried out in a vessel pressurized with $CO_2$ gas. Pressures of $CO_2$ can be as high as 1,000 psig (about 7,000 kPa). Alternatively, the refined magnesium slag material may be heated to liberate $CO_2$ prior to contacting the slag with water and $CO_2$. The time of the reaction is not critical but must be sufficient so that some of the magnesium forms magnesium bicarbonate, usually from about 1 minute to about 24 hours, preferably from about 5 minutes to about 4 hours. The temperature of the reaction is not critical but appears to be most commercially suitable if it is from about $-10°$ to about $70°$ C., with from about $4°$ to about $35°$ C. preferred.

In Step IV the $CO_2$ magnesium slag slurry is filtered to separate the radioactive solids (Th solids) from the $Mg(HCO_3)_2$ liquor. The solids contain the radioactive $^{232}Th$ and $^{230}Th$ with Th daughters and processed slag. The liquor contains the soluble components, including $Mg(HCO_3)_2$.

The radioactive solids, which are now of a reduced volume can be treated by several processes. In Step V the radioactive solids may be disposed of in a radioactive burial site. Alternatively, the radioactive solids may be compacted by conventional means in Step VI to further reduce their volume for disposal in a radioactive burial site. Alternatively, the solids may be heated and-/or compacted to further reduce their volume. The radioactive solids may be recycled in Step VII.

The liquor containing the $Mg(HCO_3)_2$ is radioactively below regulatory concern (i.e. the extracted magnesium is essentially void of radioactivity) and may be disposed of in Step VIII in any acceptable way. Alternatively, the liquor may be treated in Step IX by removing the $CO_2$ by conventional methods such as by reducing the pressure, agitating, aerating, heating or combinations of these methods ($CO_2$ may be recycled in Step XI). The resulting liquor can then be filtered to obtain $MgCO_3$, which may be sold or converted to other products such as MgO, $MgCl_2$, and $MgSO_4$ in Step X. The water may optionally be recycled in Step XII.

To ensure that the $MgCO_3$ is not radioactive in Step IX, it is desirable that barium sulfate be added to precipitate the $^{232}Th/^{230}Th$ daughters with the radioactive solids. $BaSO_4$ may be added preferably at Step II or III, or following Step IV (the filtration step). If the addition takes place after Step IV an additional filtration step is required to remove the $BaSO_4$/Th-daughter coprecipitate. Alternatively, $BaSO_4$ can be formed in situ by adding $BaCl_2$ and $Na_2SO_4$ to the $Mg(HCO_3)_2$ liquor following Step IV. This addition must be done following the $CO_2$ removal (by conventional methods) or after the solution has been acidified with HCl or $H_2SO_4$. Using this scheme also requires an additional filtration step to remove the $BaSO_4$/Th-daughter coprecipitate.

The present process utilizes carbon dioxide ($CO_2$) and water to react with Th containing magnesium slag. The magnesium slag is placed under $CO_2$ pressure. The $CO_2$ reacts with the water insoluble magnesium compounds present in the slag to form $Mg(HCO_3)_2$, which is soluble in the carbonated water. The $Mg(HCO_3)_2$ liquor is separated from the remaining solids by filtration and the excess $CO_2$ removed to precipitate $MgCO_3$. With repeated extractions (preferably from 2 to 20 times), volume and weight reductions of the radioactive material for disposal as radioactive waste of at least 50%, preferably from about 50 to 90%, by weight and volume can be attained.

No Th is extracted into the $Mg(HCO_3)_2$ liquor, however very small amounts of the $^{232}Th$ daughters are extracted. These $^{232}Th$ daughters precipitate with the $MgCO_3$ causing the resulting $MgCO_3$ to contain radioactive isotopes and be considered radioactive waste. A small amount of barium sulfate ($BaSO_4$) is added to cause coprecipitation with any solubilized $^{232}Th$ daughters which are then removed by filtration. In the presence of excess sulfate, solubilized barium is converted into $BaSO_4$, which is non-leachable. When the process is completed the concentration of radioactivity has increased by at least about 200%, preferably from at least about 200% to about 1,000%, from that present in the magnesium slag.

The invention will be further clarified by a consideration of the following examples, which are intended to be purely exemplary of the present invention.

EXAMPLE 1

A 240 G sample (approximately 325 mL) of dried, ground, radioactive magnesium slag, where the average thorium-232 ($^{232}Th$) daughter activity of the slag was 259 pCi/G (7,000 Bq/G) by gamma analysis using a germanium (Ge) detector, was added to a two liter Parr bomb reactor, followed by the addition of 1,200 mL of deionized water. The reactor was charged with 145 psig (1,100 kPa) of carbon dioxide, placed in an ice/water bath and stirred for two hours. The slurry was removed and the solids separated by vacuum filtration. To the filtrate [liquor, $Mg(HCO_3)_2$] was added HCl (18% by weight) until the pH was between 0 and 1. Metal analysis and radioactivity measurements were performed on both the remaining solids and liquor.

The remaining solids following extraction and separation were dried and weighed. The dried solids were then re-extracted by returning them to the reactor, adding 1,200 mL of deionized water, and recharging the reactor with $CO_2$. The process was repeated ten more times (a total of 12 extractions). Following 12 extractions, the final weight of the remaining solids was 43.7 G. A final weight reduction of 83% of the slag was realized. The extraction was highly selective for magnesium. The total amount of magnesium recovered after 12 extractions was 44.4 G (calculated on a magnesium metal basis). The remaining slag increased in radioactivity by approximately 6 times (600%).

Metal analysis (by atomic emission spectroscopy using an inductively coupled plasma, "ICP"), isotopic Th (by alpha analysis), and gamma analysis for Th-daughters all demonstrated the absence of Th in the $Mg(HCO_3)_2$ liquor. A small amount, about 0.6 pCi/mL (16 Bq/mL) of the $^{232}Th$ daughters were extracted into the liquor.

EXAMPLE 2

Dried, radioactive magnesium slag [249 G, 259 pCi/G (7,000 Bq/G)] was treated as in Example 1 for one extraction. After filtering the remaining solids, the $Mg(HCO_3)_2$ liquor contained 0.6 pCi/mL (16 Bq/mL) average $^{232}Th$ daughters. The liquor was aerated to remove the $CO_2$ and precipitate $MgCO_3$. The $MgCO_3$ precipitate was analyzed for radioactivity and found to have 20 pCi/G (541 Bq/G) average $^{232}Th$ daughters.

EXAMPLE 3

The acidified $Mg(HCO_3)_2$ liquor from Example 1, extraction 3, was analyzed for radioactivity by gamma analysis. The average $^{232}Th$ daughter activity was 0.44 pCi/mL (12 Bq/mL). Approximately ten drops of concentrated $H_2SO_4$ was added to the liquor, followed by 0.5 G of $BaCl_2.2H_2O$ in 10.5 G of deionized water. The liquor was then re-filtered and the filtrate analyzed for radioactivity. The average $^{232}Th$ daughters activity was 0.035 pCi/mL (0.9 Bq/G). Upon reanalysis of the filtrate three days later, no detectable levels of $^{232}Th$ daughters were found.

EXAMPLE A COMPARATIVE

Dried, radioactive magnesium slag, 251 G, was treated as in Example 1 for one extraction. However, after filtering the liquor was not acidified. The liquor was then treated with 0.5 G of $BaCl_2.10H_2O$ and 0.8 G of $Na_2SO_4$. The liquor was filtered again and aerated to remove $CO_2$. The white $MgCO_3$ precipitate was analyzed for radioactivity and found to have 62 pCi/G (1676 Bq/G) average of $^{232}Th$ daughters. The liquor following both precipitations was found to have 0.01 pCi/mL (0.3 Bq/mL) average of $^{232}Th$ daughters.

EXAMPLE 4

Dried, radioactive refined magnesium slag [253 G, 259 pCi/G (7,000 Bq/G)] was treated as in Example 1 for one extraction. After filtering the remaining solids, 10 mL of a $BaSO_4$ suspension (prepared from 0.225 G of $BaCl_2.2H_2O$, 12 G of $K_2SO_4$, 6 mL (1.1 G) of $H_2SO_4$ and 100 mL of water) was added to the $Mg(HCO_3)_2$ filtrate. The liquor was then filtered to remove the $BaSO_4$ coprecipitated with the $^{232}Th$ daughters. The filtrate was analyzed for radioactivity and the average $^{232}Th$ daughter activity was 0.145 pCi/G (3.9 Bq/G). The $MgCO_3$ precipitate activity was approximately 4.4 pCi/G (119 Bq/G). Three days later no $^{232}Th$ daughters were found in the $MgCO_3$ precipitate.

EXAMPLE 5 RECYCLE OF $BaSO_4$

Dried, radioactive magnesium slag, 274 G, was treated as in Example 1 for one extraction. In addition, 10 mL of a $BaSO_4$ suspension (prepared as in Example 4) was added. The remaining solids were filtered and $Mg(HCO_3)_2$ liquor aerated to remove the $CO_2$ and precipitate $MgCO_3$. The $MgCO_3$ was analyzed for radioactivity and found to have 1.8 pCi/G (49 Bq/G) average of $^{232}Th$ daughters.

The remaining slag solids were then recycled as in Example 1 for one extraction without adding more $BaSO_4$. The precipitated $MgCO_3$ was analyzed for radioactivity and found to have 4.4 pCi/G (119 Bq/G) average of $^{232}Th$ daughters.

After a third extraction (by the procedure of Example 1), the precipitated $MgCO_3$ was found to have 14 pCi/G (378 Bq/G) average of $^{232}Th$ daughters.

EXAMPLE 6 NON-RADIOACTIVE MAGNESIUM SLAG

A. $CO_2$ Process

A 240 G sample (325 mL) of dried, ground, non-radioactive crude magnesium slag was extracted 10 times in the manner described for Example 1. A metal analysis by ICP was performed on the acidified $Mg(HCO_3)_2$ liquors. The remaining solids following extraction and separation were dried and weighed. Following 10 extractions the remaining solids weighed 54.1 G. A final weight reduction of 77.5% of the slag was realized. The process was highly selective for magnesium and the total amount of magnesium recovered after ten extractions was 46 G (calculated on a magnesium metal basis).

B. Compaction Process

A 49 G portion of the remaining dried slag material after the ten extractions was mixed with 20 mL of deionized water and then compacted to 41 mL using a Harvard miniature compactor [40 lb. (1.8 kg) spring]. Thus the 54 G sample could be compacted to 45 mL.

Combining both the extraction process and the compaction method permitted an 86% volume reduction.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. In a process for separating magnesium from a magnesium slag using water and carbon dioxide, the improvement comprises:
    a) forming an aqueous magnesium slurry from the magnesium slag, which slag contains radioactive thorium and its daughters, and water;
    b) solubilizing magnesium from the magnesium slurry by reacting the aqueous magnesium slurry with carbon dioxide;

c) selectively concentrating by filtering the radioactive thorium and its daughters such that the radioactive thorium and its daughters are separated from the solubilized magnesium filtrate; and d) reducing volume and/or weight of radioactive solids for disposal as radioactive waste.

2. The process of claim 1 wherein the volume and/or weight of radioactive solids for disposal as radioactive waste has been reduced by at least about 50%.

3. The process of claim 2 wherein the volume and/or weight of radioactive solids for disposal as radioactive waste has been reduced from about 50% to about 90%.

4. The process of claim 1(d) wherein an increased concentration of radioactivity from radioactive thorium and its daughters has occurred by at least about 200% from that present in the magnesium slag.

5. The process of claim 4 wherein the concentration of radioactivity has increased from at least about 200% to about 1,000% from that present in the magnesium slag.

6. The process of claim 1 wherein a ratio of water to magnesium slag used is at least about 1:1.

7. The process of claim 6 wherein the ratio of water to magnesium slag is from about 1:1 to about 10:1.

8. The process of claim 6 wherein the ratio of water to magnesium slag is from about 1:1 to about 5:1.

9. The process of claim 6 wherein the ratio of water to magnesium slag is about 3:1.

10. The process of claim 1 wherein the carbon dioxide is at a pressure from greater than ambient to about 1,000 psig (about 7,000 kPa).

11. The process of claim 10 wherein the carbon dioxide is at a pressure from about 50 to about 500 psig (about 450 to about 3,500 kPa).

12. The process of claim 1 wherein the volume of radioactive solids is further reduced after Step (d) by compacting the solids.

13. The process of claim 1 wherein after Step (d) the volume and/or weight of radioactive solids is further reduced by heating the solids.

14. The process of claim 1 wherein after Step (d) the volume and/or weight of radioactive solids is further reduced by compacting and heating the solids.

15. The process of claim 1 wherein the magnesium slag is heated prior to addition of the water and carbon dioxide.

16. The process of claim 1 wherein the steps are repeated at from 1 to 20 times.

17. The process of claim 1 wherein the carbon dioxide is added at a temperature of from about −10° to about 70° C.

18. The process of claim 17 wherein the carbon dioxide is added at a temperature of from about 4° to about 35° C.

19. The process of claim 1(c) wherein the solubilized magnesium is essentially void of radioactivity from radioactive thorium and its daughters.

20. The process of claim 1 wherein barium sulfate is added to the magnesium slurry after Step (a) prior to reacting with carbon dioxide.

21. The process of claim 1 wherein after Step (c) the filtrate has barium sulfate added.

22. The process of claim 21 wherein an insoluble barium sulfate-thorium daughter coprecipitate is separated from the filtrate.

23. The process of claim 1 wherein in Step (c) the radioactive thorium and its daughter solids are filtered and then barium sulfate is prepared in situ in the filtrate after either removal of excess carbon dioxide from the filtrate or after acidifying the filtrate.

24. The process of claim 23 wherein an insoluble barium sulfate-thorium daughter coprecipitate is separated from the filtrate.

25. In a process for separating magnesium from a magnesium slag using water and carbon dioxide, the improvement comprises:

a) forming an aqueous magnesium slurry from the magnesium slag, which slag contains radioactive thorium and its daughters, and water;

b) solubilizing magnesium from the magnesium slurry by reacting the aqueous magnesium slurry with carbon dioxide wherein the carbon dioxide is at a pressure from greater than ambient to about 1,000 psig (about 7,000 kPa);

c) selectively concentrating by filtering the radioactive thorium and its daughters such that the radioactive thorium and its daughters are separated from the solubilized magnesium filtrate; and d) reducing volume and/or weight of radioactive solids for disposal as radioactive waste.

26. The process of claim 25 wherein the carbon dioxide is at a pressure from about 50 to about 500 psig (about 450 to about 3,500 kPa).

27. The process of claim 25 wherein the magnesium slag is heated prior to addition of the water and carbon dioxide.

28. The process of claim 25 wherein barium sulfate is added to the magnesium slurry after Step (a) prior to reacting with carbon dioxide.

29. The process of claim 25 wherein after Step (c) the filtrate has barium sulfate added.

* * * * *